(12) United States Patent
Oner et al.

(10) Patent No.: US 11,005,348 B2
(45) Date of Patent: May 11, 2021

(54) MULTI-TEETH SWITCHED RELUCTANCE MOTOR WITH SHORT FLUX PATH

(71) Applicant: Enedym Inc., Hamilton (CA)

(72) Inventors: Yasemin Oner, Hamilton (CA); Berker Bilgin, Hamilton (CA); Ali Emadi, Burlington (CA)

(73) Assignee: Enedym Inc., Hamilton (CA)

(*) Notice: Subject to any disclaimer, the term of this patent is extended or adjusted under 35 U.S.C. 154(b) by 407 days.

(21) Appl. No.: 16/197,468

(22) Filed: Nov. 21, 2018

(65) Prior Publication Data

US 2019/0157953 A1 May 23, 2019

Related U.S. Application Data

(60) Provisional application No. 62/589,313, filed on Nov. 21, 2017.

(51) Int. Cl.
| | |
|---|---|
| *H02K 1/14* | (2006.01) |
| *H02K 19/10* | (2006.01) |
| *H02K 15/02* | (2006.01) |
| *H02K 1/24* | (2006.01) |

(52) U.S. Cl.
CPC ......... *H02K 19/103* (2013.01); *H02K 15/022* (2013.01); *H02K 1/146* (2013.01); *H02K 1/246* (2013.01); *H02K 2213/03* (2013.01)

(58) Field of Classification Search
CPC .... H02K 15/022; H02K 19/103; H02K 1/146; H02K 1/246; H02K 2213/03
See application file for complete search history.

(56) References Cited

U.S. PATENT DOCUMENTS

| | | | | |
|---|---|---|---|---|
| 4,626,719 | A * | 12/1986 | Foster | H02K 37/04 310/114 |
| 2019/0148998 | A1* | 5/2019 | Oner | H02P 25/098 310/49.44 |
| 2019/0190364 | A1* | 6/2019 | Oner | H02K 19/103 |
| 2019/0199147 | A1* | 6/2019 | Woo | H02K 1/145 |

* cited by examiner

*Primary Examiner* — Dang D Le
(74) *Attorney, Agent, or Firm* — Bereskin & Parr LLP/S.E.N.C.R.L, s.r.l.

(57) ABSTRACT

Various embodiments are described herein for switched reluctance machine configurations. In at least one embodiment, a switched reluctance machine configured according to the teachings herein includes an axially extending shaft, an axially extending rotor mounted to the shaft, the rotor having a plurality of salient rotor poles, an axially extending stator disposed coaxially and concentrically with the rotor, the stator having a plurality of salient stator poles protruding radially from the stator towards the rotor poles, a plurality of stator teeth and tooth-tips, and a plurality of electrical coils wound about the stator poles to define a plurality of phases of the switched reluctance machine, where a number of stator poles can be determined according to the following equation and at least one constraint condition:

$$N_s = \frac{N_t \times LCM(N_s, N_r)}{N_r \times N_{ph} \times S_1 \times S_2}.$$

10 Claims, 16 Drawing Sheets

MULTI-TEETH SWITCHED RELUCTANCE MOTOR WITH SHORT FLUX PATH

CROSS-REFERENCE TO RELATED CASES

This application claims the benefit of U.S. Provisional Application Ser. No. 62/589,313, filed Nov. 21, 2017, which is incorporated by reference herein.

FIELD OF THE INVENTION

The described embodiments relate generally to switched reluctance machines, and in particular, to a multi-teeth switched reluctance machine with short flux paths.

BACKGROUND

Electric machines convert electrical energy to mechanical energy, or mechanical energy to electrical energy. To accomplish this, electrical machines establish and control electromagnetic fields to create the desired electromagnetic performance.

One variety of electric machines is a switched reluctance machine ("SRM"). A typical SRM includes two basic components, namely i) a stationary component which generates a rotating electromagnetic field, generally referred to as the 'stator'; and ii) a rotating part, generally referred to as the 'rotor'. An advantage of SRM is that there is no excitation source on the rotor.

SRM operates based on varying reluctance. In an SRM, the electromagnetic torque is produced by the magnetic attraction of the steel rotor to steel electromagnets. Enhanced torque performances can be obtained by improving the structure of the stator. However, conventional configurations of SRMs have conventional concentrated windings that may result in long flux paths and increased core losses.

SUMMARY

In one aspect of the disclosure, in at least one embodiment described herein, there is provided a switched reluctance machine comprising: an axially extending shaft; an axially extending rotor mounted to the shaft, the rotor having a plurality of salient rotor poles; an axially extending stator disposed coaxially and concentrically with the rotor, the stator having a plurality of salient stator poles protruding radially from the stator towards the rotor poles, the stator further having a plurality of stator teeth and tooth-tips; and a plurality of electrical coils wound about the stator poles, the plurality of electrical coils including a plurality of separate phase coils defining a plurality of phases of the switched reluctance machine, wherein a number of stator poles is related to a number of rotor poles, a number of stator teeth, a number of stator teeth per stator pole, and a number of adjacent poles having opposite polarities, and a number of phases, according to $$N_s = \frac{N_t \times LCM(N_s, N_r)}{N_r \times N_{ph} \times S_1 \times S_2}$$

and at least one constraint condition, wherein $N_{ph}$ is the number of phases when $N_s=N_r+2$ if $S_1=2$, and wherein $N_s$ is the number of stator poles, $N_r$ is the number of rotor poles, $N_t$ is the number of stator teeth, $N_{ph}$ is the number of phases, $S_1$ is the number of stator teeth per stator pole, $S_2$ is the number of adjacent poles having opposite polarities, and LCM is the lowest common multiple of number of stator poles and number of rotor poles.

In some embodiments, the at least one constraint condition comprises the following: If $|N_s-N_r|=2p_1$ and $|N_r-N_r|=2p_2$; $p_1>p_2$ and $mod(p_1,p_2)=0$.

In some embodiments, the at least one constraint condition further comprises a greater distance between adjacent rotor poles of the plurality of rotor poles than an arc length of a stator tooth.

In some embodiments, the at least one constraint condition further comprises each of a rotor pole arc length and a stator tooth arc length being larger than or equal to $$\frac{2\pi}{N_r N_{ph}}.$$

In some embodiments, the at least one constraint condition further comprises the following: $3\beta_r+2\beta_{rs}>2\beta_s+\beta_{ss}$, wherein $\beta_r$ is a rotor pole angle, $\beta_{rs}$ is a rotor slot angle, $\beta_s$ is a stator teeth angle and $\beta_{ss}$ is a stator slot angle.

In some embodiments, the at least one constraint condition comprises various combinations of above-noted constraint conditions.

In a further aspect, in at least one embodiment described herein, there is provided a method of manufacturing a switched reluctance machine having an axially extending shaft, an axially extending rotor mounted to the shaft, an axially extending stator disposed coaxially and concentrically with the rotor, the rotor having a plurality of salient rotor poles, the stator having a plurality of salient stator poles protruding radially from the stator towards the rotor poles, the stator further having a plurality of stator teeth and tooth-tips, the switched reluctance machine further having a plurality of electrical coils wound about the stator poles to define a plurality of phases of the switched reluctance machine, where the method comprises determining a number of stator poles according to $$N_s = \frac{N_t \times LCM(N_s, N_r)}{N_r \times N_{ph} \times S_1 \times S_2}$$

and at least one constraint condition, wherein $N_{ph}$ is the number of phases when $N_s=N_r+2$ if $S_1=2$, and wherein $N_s$ is the number of stator poles, $N_r$ is the number of rotor poles, $N_t$ is the number of stator teeth, $N_{ph}$ is the number of phases, $S_1$ is the number of stator teeth per stator pole, $S_2$ is the number of adjacent poles having opposite polarities, and LCM is the lowest common multiple of number of stator poles and number of rotor poles.

In some embodiments, the at least one constraint condition comprises the following: If $|N_s-N_r|=2p_1$ and $|N_r-N_r|=2p_2$; $p_1>p_2$ and $mod(p_1,p_2)=0$.

In some other embodiments, the at least one constraint condition further comprises a greater distance between adjacent rotor poles of the plurality of rotor poles than an arc length of a stator tooth.

In some further embodiments, the at least one constraint condition further comprises each of a rotor pole arc length and a stator tooth arc length being larger than or equal to $$\frac{2\pi}{N_r N_{ph}}.$$

In some other embodiments, the at least one constraint condition further comprises the following: $3\beta_r+2\beta_{rs}>2\beta_s+\beta_{ss}$, wherein $\beta_r$ is a rotor pole angle, $\beta_{rs}$ is a rotor slot angle, $\beta_s$ is a stator teeth angle and $\beta_{ss}$ is a stator slot angle.

In some embodiments, the at least one constraint condition comprises various combinations of above-noted constraint conditions.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

DRAWINGS

For a better understanding of the various embodiments described herein, and to show more clearly how these various embodiments may be carried into effect, reference will be made, by way of example, to the accompanying drawings which show at least one example embodiment and which will now be briefly described.

Figure 1:
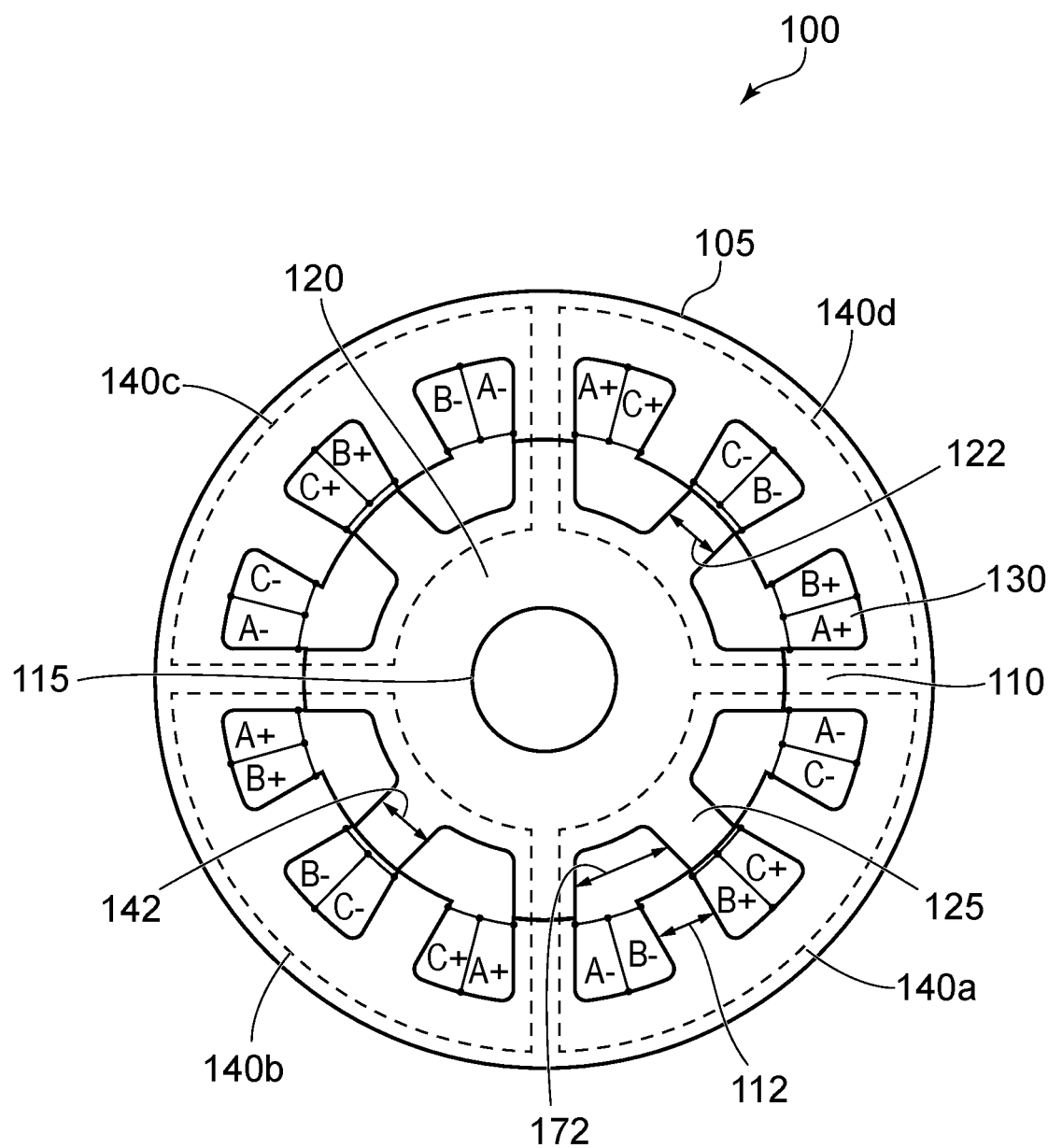
FIG. 1 shows a cross-sectional view of a switched reluctance machine according to an example.

The skilled person in the art will understand that the drawings, described below, are for illustration purposes only. The drawings are not intended to limit the scope of the applicants' teachings in anyway. Also, it will be appreciated that for simplicity and clarity of illustration, elements shown in the figures have not necessarily been drawn to scale. Further, where considered appropriate, reference numerals may be repeated among the figures to indicate corresponding or analogous elements.

DETAILED DESCRIPTION

Unless otherwise indicated, the definitions and embodiments described in this and other sections are intended to be applicable to all embodiments and aspects of the present application herein described for which they are suitable as would be understood by a person skilled in the art.

In understanding the scope of the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

As used in this application, the singular forms "a", "an" and "the" include plural references unless the content clearly dictates otherwise.

In embodiments comprising an "additional" or "second" component, the second component as used herein is physically different from the other components or first component. A "third" component is different from the other, first, and second components, and further enumerated or "additional" components are similarly different.

The term "and/or" as used herein means that the listed items are present, or used, individually or in combination. In effect, this term means that "at least one of" or "one or more" of the listed items is used or present.

Embodiments described herein relate to switched reluctance machines (SRMs). FIG. 1 shows a cross-sectional view of an example three-phase switched reluctance machine 100. The SRM 100 is an example of a switched reluctance machine with twelve (12) stator poles and eight (8) rotor poles. The SRM 100 includes salient poles on the rotor and the stator. The SRM 100 also has concentrated coil windings. The salient pole configuration on both the rotor and the stator provides a relatively simple manufacturing process and robust operation for SRM.

As shown, switched reluctance machine 100 includes a stator 105 and a rotor 120. The rotor 120 is mounted to a rotatable shaft 115. The stator 105 and rotor 120 may be disposed concentrically and coaxially with one another and with the shaft 115. In the SRM 100, the rotor 120 is positioned radially inward of the stator 105.

Both the stator 105 and rotor 120 include a plurality of protrusions that define salient poles. The stator 105 has a stator core that includes a plurality of stator poles 110, in this case twelve stator poles 110. The rotor 120 includes a plurality of rotor poles 125, in this case eight rotor poles 125. The stator poles 110 protrude radially from the stator core towards the rotor 120. Similarly, the rotor poles 125 protrude radially from the rotor 120 towards the stator 105.

The shaft 115 may be positioned within a central bore of the machine 100. As mentioned above, the SRM 100 is an example of a twelve stator pole and eight rotor pole switched reluctance machine with concentrated coil windings. That is, the stator 105 has coil windings 130 around each stator pole 110.

The coils 130 are wound around each stator pole 110 and connected together to create the phase windings for each phase. In an SRM, such as SRM 100, the coils 130 on diametrically opposite stator pole pairs are connected in series or in parallel to form a phase of the machine. SRMs may be designed with varying numbers of stator and rotor poles, and varying number of phases. In general, SRMs typically do not include excitation sources on the rotor 120.

Also illustrated in SRM 100 are the number of stator poles per phase at an unaligned position of the SRM 100. As shown, the stator poles 110 of the SRM 100 can be grouped in a first sub-group 140a, in a second sub-group 140b, in a third sub-group 140c and in a fourth sub-group 140d. The coils 130 in the different sub-groups may be connected in series or in parallel to form the various phases of the SRM 100. Also shown in FIG. 1A are stator slot angle 142, stator pole angle 112, rotor slot angle 172 and rotor pole angle 122.

In an SRM, such as SRM 100, reluctance torque is the sole torque producing mechanism. When phase windings on the stator poles 110 of SRM 100 are excited with current, the excited pole draws the nearest rotor pole 125 into alignment with it to minimize the reluctance in the phase. In order to create motoring torque, the phases are excited on the rising slope of their inductance profiles.

Figure 2:
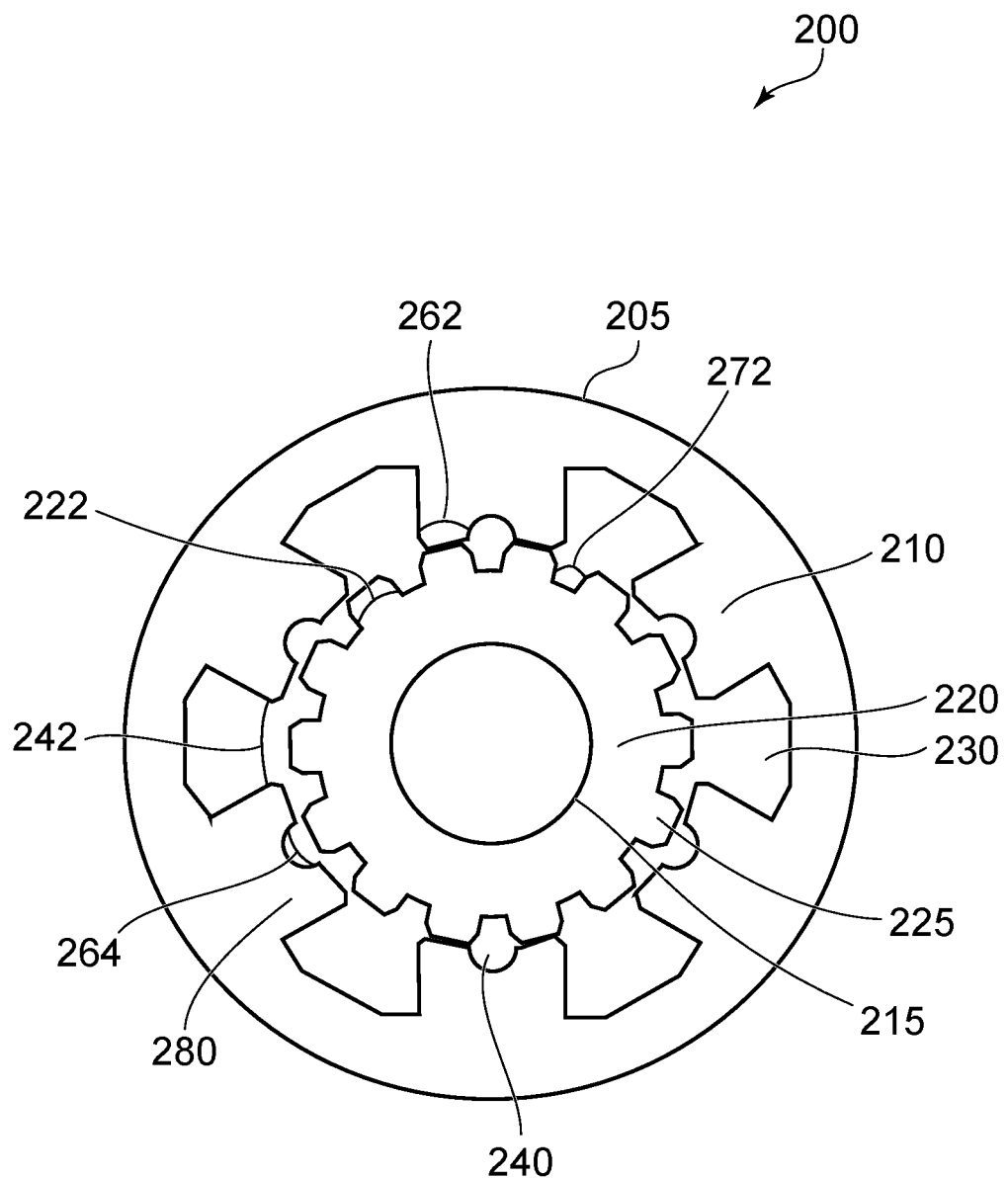
FIG. 2 shows a cross-sectional view of a switched reluctance machine according to another example.

Reference is next made to FIG. 2, which shows an example configuration of SRM, such as SRM 200. As shown, switched reluctance machine 200 includes a stator 205 and a rotor 220. The rotor 220 is mounted to a rotatable shaft 215, and the stator 205 and rotor 220 are disposed concentrically and coaxially with one another and with the shaft 215. In the SRM 200, the rotor 220 is positioned radially inward of the stator 205.

The stator 105 has a stator core that includes a plurality of stator poles 210, in this case six stator poles 210, and a plurality of stator teeth 260. As shown, the stator 205 has multi stator teeth 260 per stator pole 210. The rotor 220 includes a plurality of rotor poles 225, in this case fourteen rotor poles 225. The stator poles 210 protrude radially from the stator core towards the rotor 220. Similarly, the rotor poles 225 protrude radially from the rotor 220 towards the stator 205.

In particular, FIG. 2 shows a configuration of SRM 200 that includes six (6) stator poles 210, twelve (12) stator teeth 260 and fourteen (14) rotor poles 225. In this configuration, each stator pole 210 is generally rectangular in cross-sectional shape, and has two stator teeth 260 at its radially innermost end connected by a central longitudinally extending slot (or auxiliary) 240. In this topology of SRM 200 with bifurcated teeth, with each stator pole 210 having only two teeth 260, the number of stator poles is typically Ns, the number of stator teeth is 2Ns, and the number of rotor poles is 2Ns+2.

While FIG. 2 illustrates a 6/12/14 SRM configuration (in the format: # of stator poles/# of stator teeth/# of rotor poles), other similar possible SRM configurations include 12/24/26 and 24/48/50 multi-teeth SRMs.

FIG. 2 also shows a stator slot angle 242, a stator teeth angle 262, a teeth opening angle 264, a rotor slot angle 272 and a rotor pole angle 222.

Figure 3:
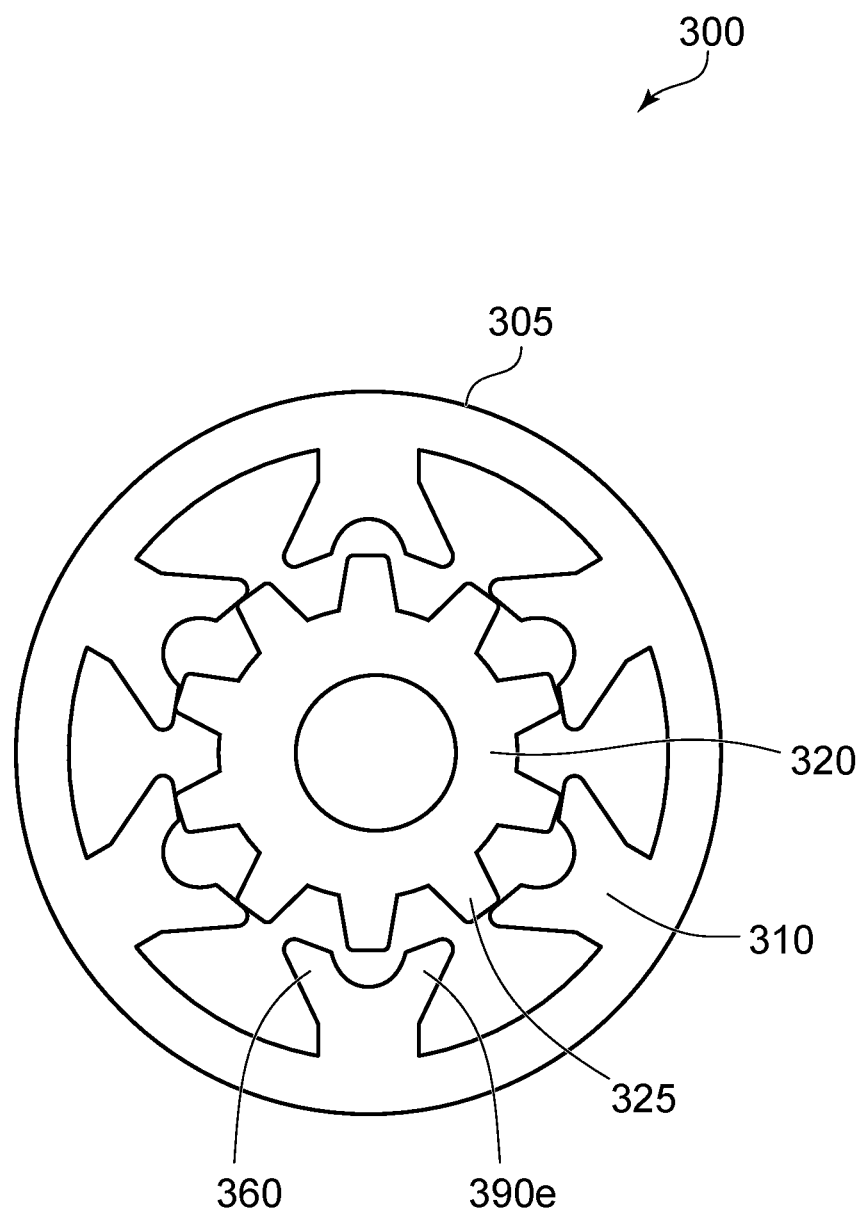
FIG. 3 shows a cross-sectional view of a switched reluctance machine according to a further example.

Reference is next made to FIG. 3, which illustrates an example configuration of SRM, such as SRM 300. SRM 300 is analogous to SRM 200 of FIG. 2, but differs in the number of stator poles 310, stator teeth 360 and rotor poles 325.

In particular, FIG. 3 shows the configuration of a multi-teeth SRM 300 that includes a stator 305 having six (6) stator poles 310 and twelve (12) stator teeth 360, and a rotor 320 having ten (10) rotor poles 325, i.e. a 6/12/10 SRM configuration. As shown, SRM 300 has two stator teeth 360 pre stator pole 310.

Figure 4:
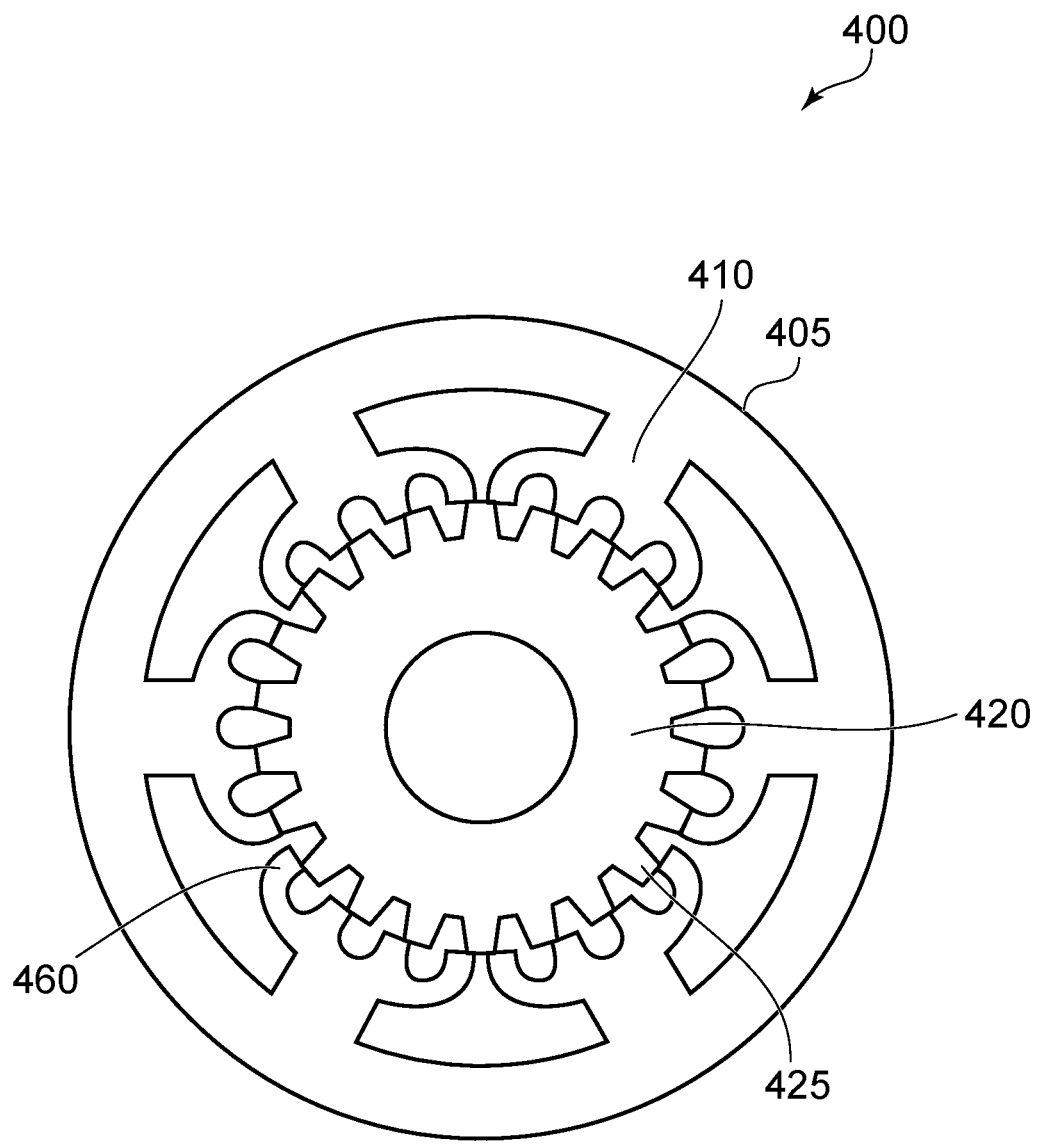
FIG. 4 shows a cross-sectional view of a switched reluctance machine according to another example.

Reference is next made to FIG. 4, which illustrates an example configuration of SRM, such as SRM 400. In particular, FIG. 4 shows the configuration of a multi-teeth SRM 400 that is analogous to SRM 200 of FIG. 2, but differs in the number of stator poles 410, stator teeth 460 and rotor poles 425.

SRM 400 includes a stator 405 and a rotor 420. Stator 405 includes six (6) stator poles 410 and twenty-four (24) stator teeth 460. Rotor 420 includes twenty-two (22) rotor poles 425, i.e. a 6/24/22 SRM configuration. As shown, SRM 400 has four stator teeth 460 per stator pole 410.

Figure 5:
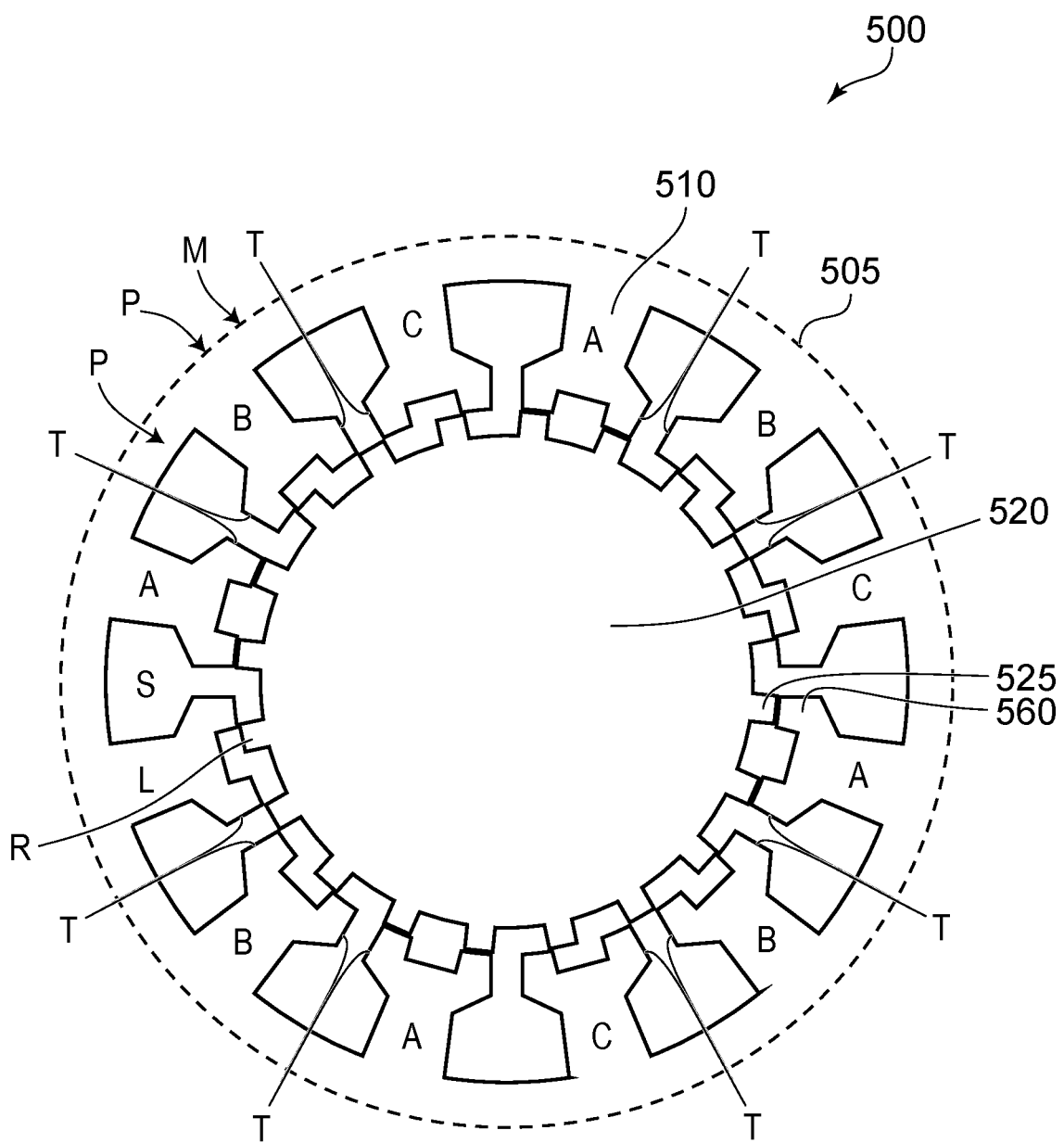
FIG. 5 shows a cross-sectional view of a switched reluctance machine according to a further example.

FIG. 5 illustrates an example configuration of SRM, such as SRM 500. In particular, FIG. 5 shows the configuration of a multi-teeth SRM 500 having a stator 505 and a rotor 520. Stator 505 has twelve (12) stator poles 510 and twenty-four (24) stator teeth 560. Rotor 520 has twenty (20) rotor poles 525. Accordingly, SRM 500 has a 12/24/20 SRM configuration.

Figure 6:
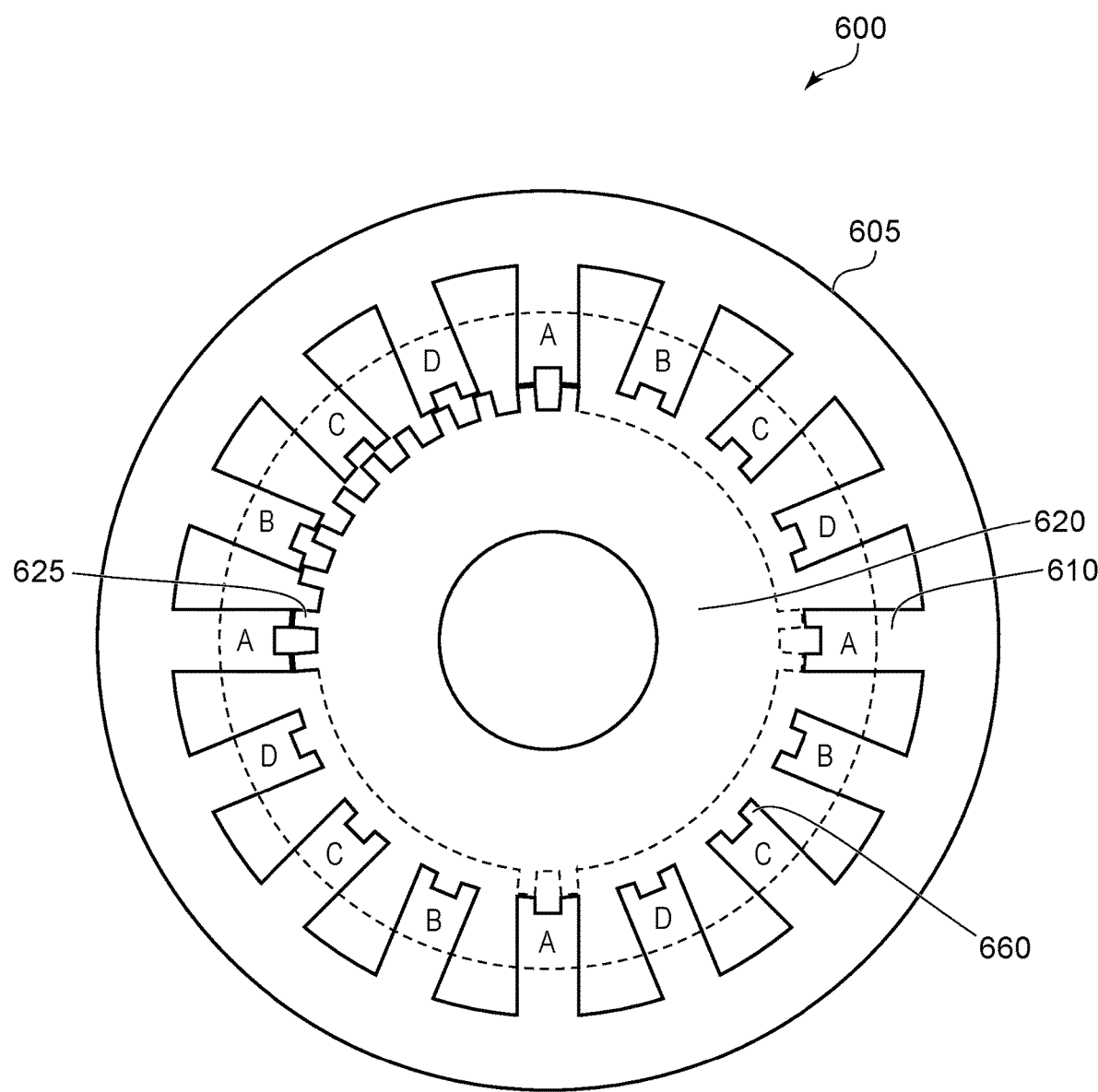
FIG. 6 shows a cross-sectional view of a switched reluctance machine according to another example.

Reference is next made to FIG. 6, which illustrates an example configuration of SRM, such as SRM 600. In particular, FIG. 6 shows the configuration of a multi-teeth SRM 600 with a stator 605 and a rotor 620. Stator 605 includes twelve (12) stator poles 610 and twenty-four (24) stator teeth 660. Rotor 620 includes thirty-two (32) rotor poles 125. Accordingly, SRM 600 has two stator teeth 660 per stator pole 610, and provides a 12/24/32 SRM configuration.

Figure 7A:
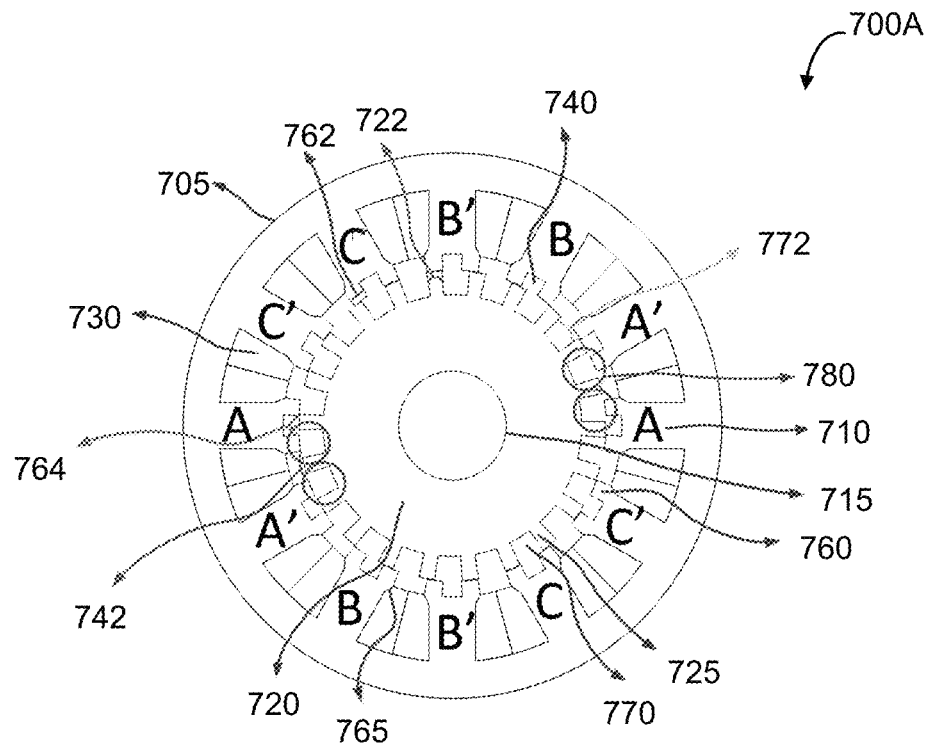
FIG. 7A shows a cross-sectional view of a switched reluctance machine according to an example.

Reference is next made to FIG. 7A, which shows an example configuration of SRM, such as SRM 700A. As shown, SRM 700A is a three-phase, multi-teeth SRM. SRM 700 has a stator 705, a rotor 720, stator poles 710, rotor poles 725 and stator teeth 760. SRM 700 also has stator tooth-tips 765. In this configuration of SRM 700A, coils 730 are wound around the stator poles 705 to provide a three-phase SRM. The SRM 700A has auxiliary slots 740, which do not have any copper windings.

As shown, the stator 705 and rotor 720 are disposed concentrically and coaxially with one another and with the shaft 715. In the SRM 700, the rotor 720 is positioned radially inward of the stator 705.

SRM 700A also shows a stator slot angle 742, a rotor slot angle 772, a stator teeth angle 762, a stator teeth opening angle 764 and a rotor pole angle 722.

Figure 7B:
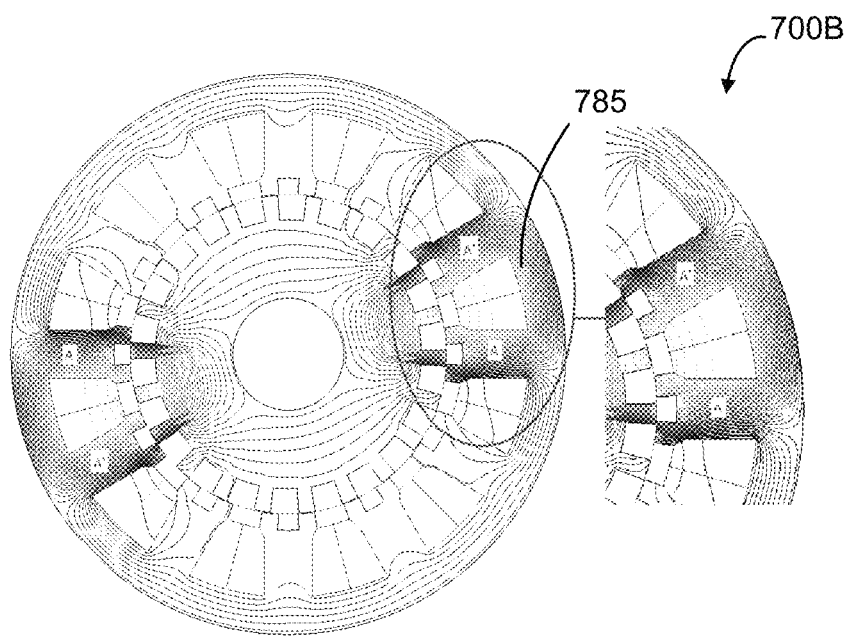
FIG. 7B shows a cross-sectional view of the switched reluctance machine of FIG. 7A in an unaligned position according to an example.

FIG. 7A shows a fully unaligned position 780, where the center of a rotor slot 770 is aligned with the center of stator tooth 760. FIG. 7B shows an example configuration of SRM, such as SRM 700B. In particular, FIG. 7B shows the magnetic flux lines 785 when the SRM 700A is in an unaligned position.

Figure 7C:
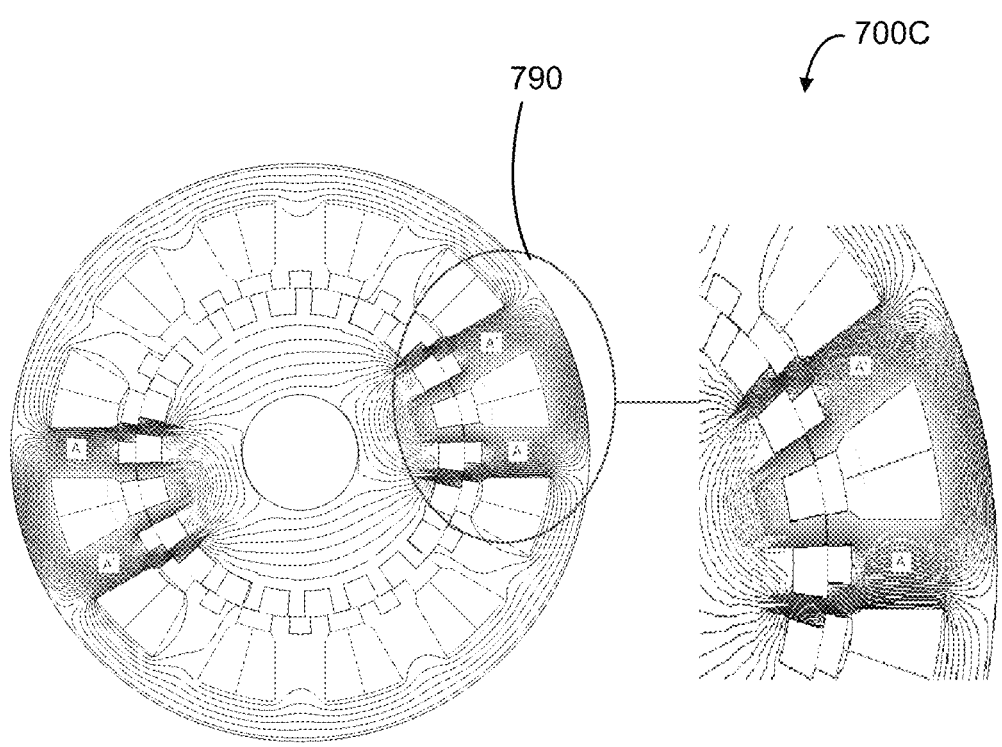
FIG. 7C shows a cross-sectional view of the switched reluctance machine of FIG. 7A in an aligned position according to an example.

FIG. 7C shows an example configuration of SRM, such as SRM 700C. In particular, FIG. 7C shows the magnetic flux lines 790 when the SRM 700A is in an aligned position. In the aligned position, the center of the rotor pole 725 is aligned with the center of the stator tooth 760.

As illustrated in SRMs 700A-700C, the SRM configuration has twelve (12) stator poles 710, twenty-four (24) stator teeth 760, and twenty-two (22) rotor poles 825, i.e. a 12/24/22 SRM configuration.

In the various embodiments disclosed herein, the relationship between the number of stator poles ($N_s$) 710, number of rotor poles ($N_r$) 725, number of phases ($N_{ph}$), number of stator teeth ($N_t$), number of teeth per stator pole ($S_1$) and number of adjacent poles having opposite polarities ($S_2$) may be defined by equation (1).

$$N_s = \frac{N_t \times LCM(N_s, N_r)}{N_r \times N_{ph} \times S_1 \times S_2} \quad (1)$$

LCM ($N_s$, $N_r$) indicates the lowest common multiple of the number of stator poles and number of rotor poles. $N_{ph}$ is the number of phases when $N_s=N_r+2$, if $S_1=2$.

The SRM configurations based on the relationships described in equation (1) have shorter flux paths. This may provide the advantage of reducing or lowering core losses.

As shown in FIG. 7A, the winding configuration of coils 730 in the counterclockwise direction is A-A'-B-B'-C-C' for one half of the stator circumference. In this case, the adjacent pole pairs having opposite polarities ($S_2$) is 2.

In the embodiment of FIG. 7A, the stator pole has multiple teeth 760 and tooth-tips 765. In the various embodiments disclosed herein, the number of machine periodicity may be determined from the flux paths, based on equation (2) provided below. In equation (2), $N_s$ is number of stator poles, $N_r$ is number of rotor poles and LCM ($N_s$, $N_r$) is the lowest common multiple of $N_s$ and $N_r$:

$$MP = \frac{N_s N_r}{LCM(N_s, N_r)} \quad (2)$$

In the embodiment illustrated in FIGS. 7A-7C, the machine periodicity is 2 (i.e. (12*22)/132=2, using equation (2)). This is also seen in FIGS. 7B and 7C, where there are two short flux paths in opposite directions.

Figure 8A:
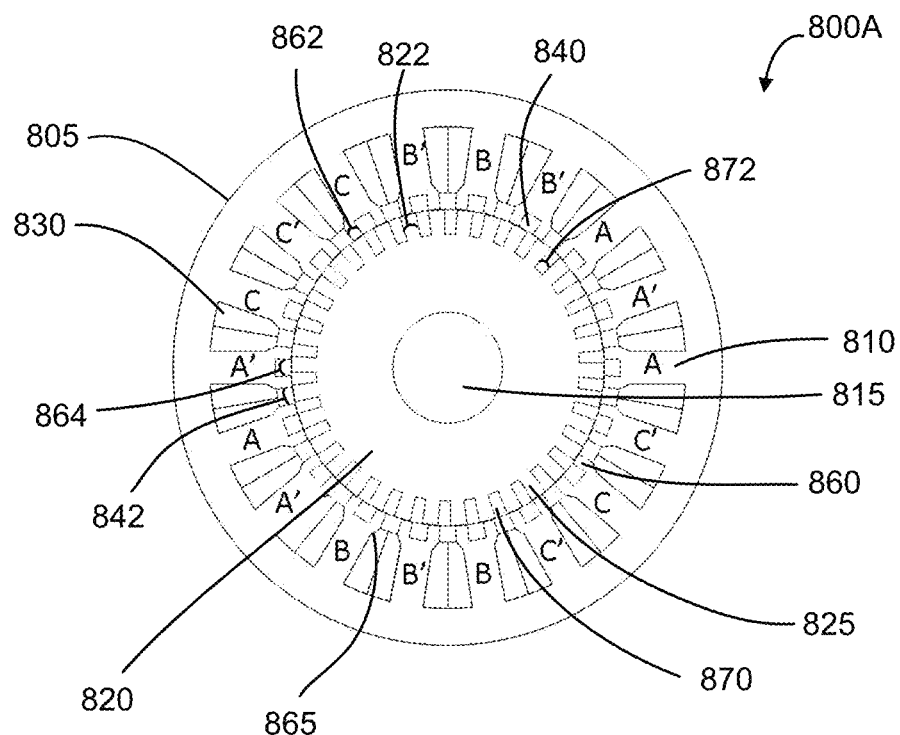
FIG. 8A shows a cross-sectional view of a switched reluctance machine according to an example.

Reference is next made to FIG. 8A, which shows an example configuration of SRM, such as SRM 800A. In particular, FIG. 8A shows the SRM configuration of a three-phase, multi-teeth SRM in an unaligned position. As illustrated, SRM 800A has a stator 805, a rotor 820, stator poles 810, rotor poles 825 and stator teeth 860. SRM 800 also has stator tooth-tips 865.

In the configuration of SRM 800A, coils 830 are wound around the stator poles 805 to provide a three-phase SRM. The SRM 800A has auxiliary slots 840, which do not have any copper windings. As shown, the stator 805 and rotor 820 are disposed concentrically and coaxially with one another and with the shaft 815. In the SRM 800, the rotor 820 is positioned radially inward of the stator 805.

SRM 800A also shows a stator slot angle 842, a rotor slot angle 872, a stator teeth angle 862, a stator teeth opening angle 864 and a rotor pole angle 822.

Figure 8B:
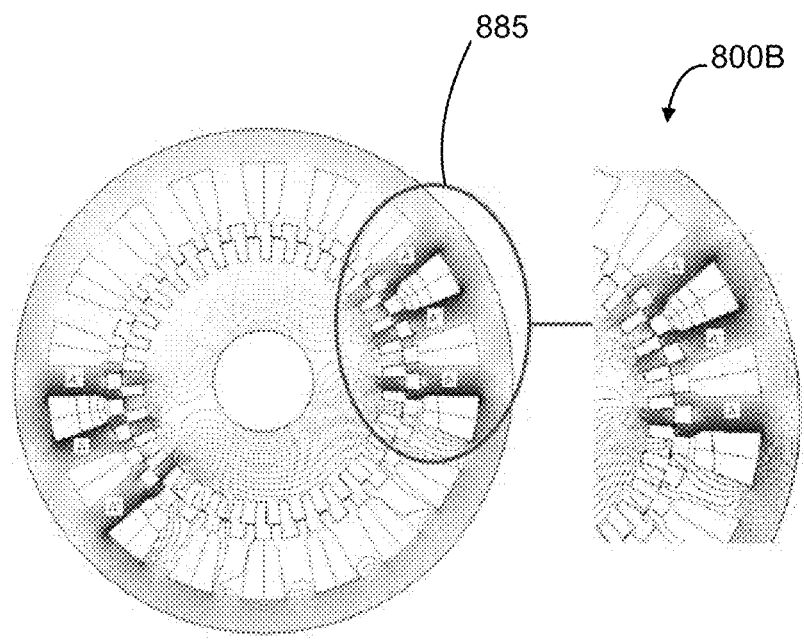
FIG. 8B shows a cross-sectional view of the switched reluctance machine of FIG. 8A in an unaligned position according to an example.

FIG. 8B shows an example configuration of SRM, such as SRM 800B. In particular, FIG. 8B shows the magnetic flux lines 885 when the SRM 800A is in an unaligned position, where the center of a rotor slot 870 is aligned with the center of a stator tooth 860.

Figure 8C:
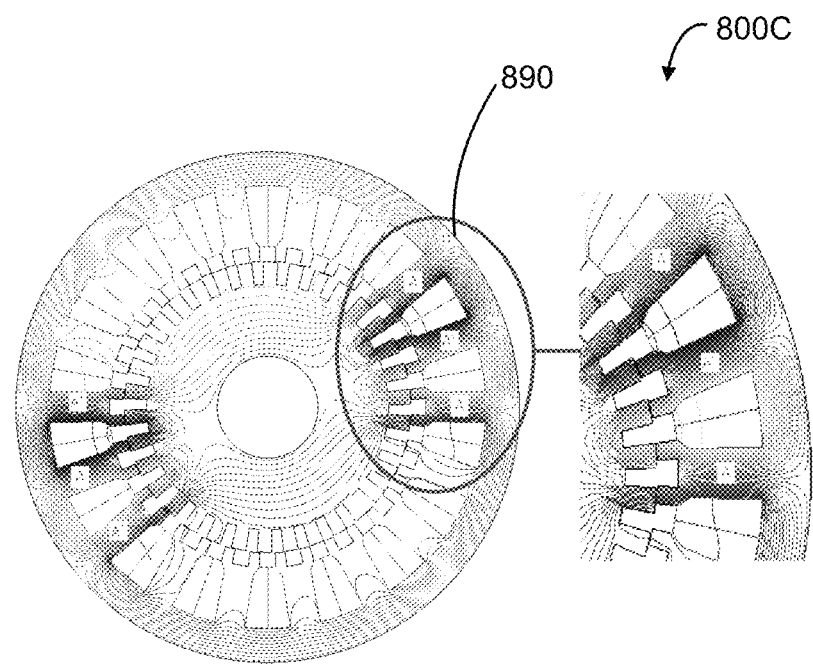
FIG. 8C shows a cross-sectional view of the switched reluctance machine of FIG. 8A in an aligned position according to an example.

FIG. 8C shows an example configuration of SRM, such as SRM 800C. In particular, FIG. 8C shows the magnetic flux lines 890 when the SRM 800A is in an aligned position. In the aligned position, a center of the rotor pole 825 is aligned with a center of the stator tooth 860.

As illustrated in SRMs 800A-800C, the SRM configuration has eighteen (18) stator poles 810, thirty-six (36) stator teeth 860, and thirty-four (34) rotor poles 825, i.e. a 18/36/34 SRM configuration.

As shown in FIG. 8A, the winding configuration of coils 830 in the counterclockwise direction is A-A'-A-B'-B-B'-C-C'-C for one half of the stator circumference. In this case, the adjacent pole pairs having opposite polarities ($S_2$) is 3. In the embodiments of FIGS. 8A-8C, the machine periodicity is 2. This is also seen in FIGS. 8B and 8C, where there are two flux paths in opposite directions.

Figure 9A:
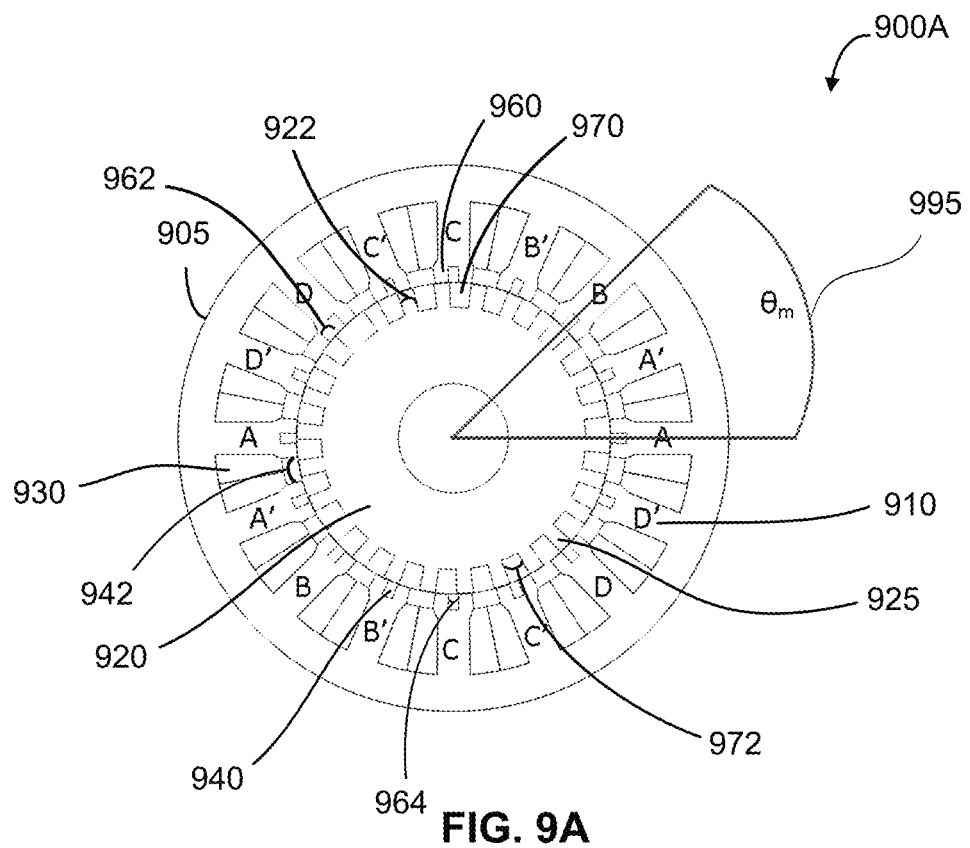
FIG. 9A shows a cross-sectional view of a switched reluctance machine according to an example.

Reference is next made to FIG. 9A, which shows an example cross-sectional view of SRM 900A. SRM 900A has a stator 905, a rotor 920, stator poles 910, rotor poles 925 and stator teeth 960. SRM 900 also has stator tooth-tips 965. In this embodiment, the SRM configuration has sixteen (16) stator poles 910, thirty-two (32) stator teeth 960, and twenty-six (26) rotor poles 925, i.e. a 16/32/26 SRM configuration.

In the configuration of SRM 900A, coils 930 are wound around the stator poles 905 to provide a four-phase SRM. The SRM 900A has auxiliary slots 940, which do not have any copper windings. SRM 900A also shows a mechanical angle ($\theta_m$) 995, which is equal to an angle between two stator poles 910.

FIG. 9A also shows a stator slot angle 942, a stator teeth angle 962, a teeth opening angle 964, a rotor slot angle 972 and a rotor pole angle 922.

Figure 9B:
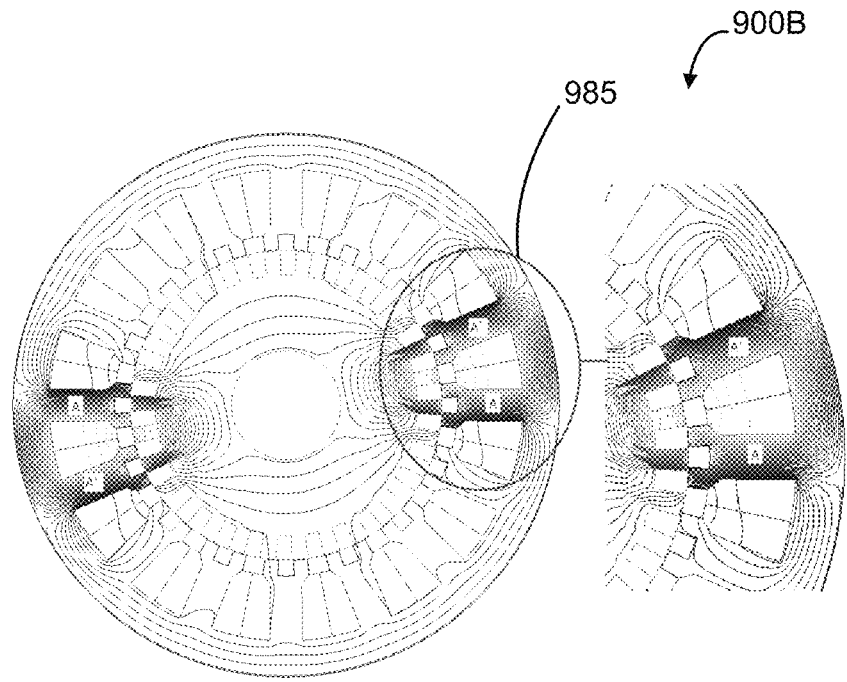
FIG. 9B shows a cross-sectional view of the switched reluctance machine of FIG. 9A in an unaligned position according to an example.

FIG. 9B shows an example configuration of SRM, such as SRM 900B. In particular, FIG. 9B shows the magnetic flux lines 985 when the SRM 900A is in an unaligned position, where the center of a rotor slot 970 is aligned with the center of stator tooth 960.

Figure 9C:
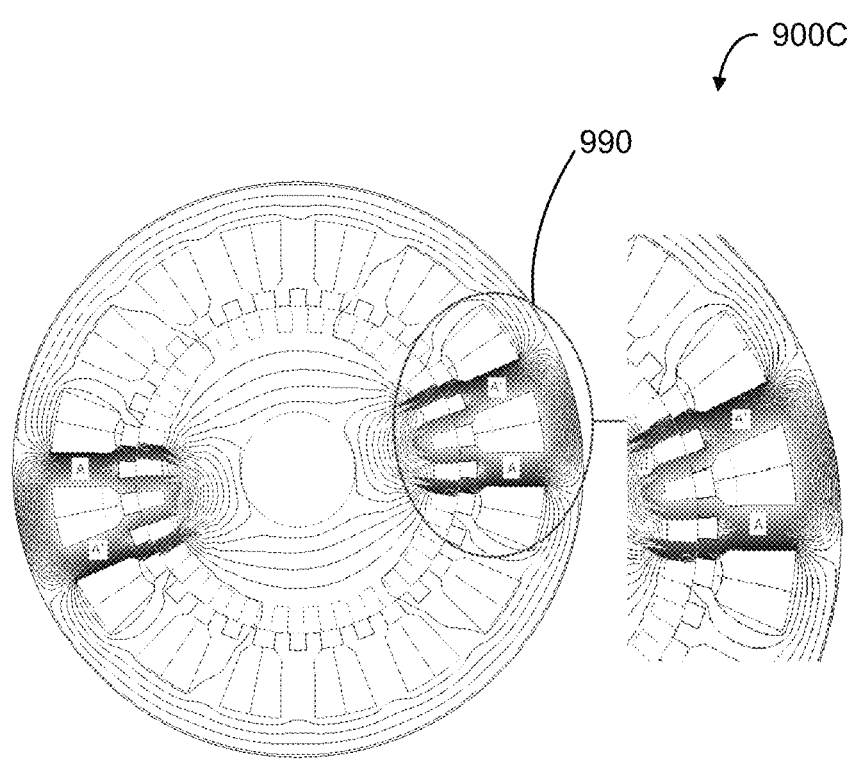
FIG. 9C shows a cross-sectional view of the switched reluctance machine of FIG. 9A in an aligned position according to an example.

FIG. 9C shows an example configuration of SRM, such as SRM 900C. In particular, FIG. 9C shows the magnetic flux lines 990 when the SRM 900A is in an aligned position. In the aligned position, the center of a rotor pole 925 is aligned with the center of a stator tooth 960.

In the embodiments illustrated in SRMs 900A-900C, the number of machine periodicity may be determined based on a relationship between the machine angle ($\theta_m$) 995 and electrical angle ($\theta_e$), as shown in equation (3):

$$\theta_e = MP \times \theta_m \quad (3)$$

Equation (3) may be rearranged to provide equations (4) and (5):

$$\frac{2\pi}{N_{ph}} = MP \times \frac{2\pi}{N_s} = MP \times \frac{2\pi \times S_1 \times S_2}{N_t} \quad (4)$$

$$N_t = MP \times S_1 \times S_2 \times N_{ph} \quad (5)$$

Based on equations (2) and (5), a relationship between a number of stator poles ($N_s$) 910, number of rotor poles ($N_r$) 925, number of phases ($N_{ph}$), number of stator teeth ($N_t$), number of teeth per stator pole ($S_1$) and number of adjacent poles having opposite polarities ($S_2$) may be determined using equation (1).

In the various embodiments illustrated herein, based on equation (1) and certain constraint conditions, a number of stator and rotor poles for various topologies of SRM, such as interior rotor, exterior rotor and axial flux SRM etc., may be determined.

A constraint condition may include the equation (6) provided below:

$$\text{If } |N_s - N_r| = 2p_1 \text{ and } |N_t - N_r| = 2p_2; \; p_1 > p_2 \text{ and mod} \\ (p_1, p_2) = 0 \quad (6)$$

In addition to constraint shown in equation (6), certain geometric constraints may also apply. For example, one example of a geometric constraint is that the length of the gap between the rotor poles (such as, for example, the length of the rotor slot 970) is larger than the arc length of the stator teeth (such as, for example, arc length of stator teeth 960) to maintain unaligned position.

In another example of a geometric constraint, the rotor pole arc length (such as, for example, arc length of rotor pole 925) and stator teeth arc length (such as, for example, arc length of stator teeth 960) are each larger than or equal to $$\frac{2\pi}{N_r N_{ph}}$$

to maintain non-overlapping inductance.

A further example of a geometric constrain is illustrated in equation (7) provided below, where $\beta_r$ is a rotor pole angle 922, $\beta_{rs}$ is a rotor slot angle 972, $\beta_s$ is a stator teeth angle 962 and $\beta_{ss}$ is a stator slot angle 942:

$$3\beta_r + 2\beta_{rs} > 2\beta_s + \beta_{ss} \quad (7)$$

As shown in FIG. 9A, the winding configuration of coils 930 in the counterclockwise direction is A-A'-B-B'-C-C'-D-D' for one half of the stator circumference. In this case, the adjacent pole pairs having opposite polarities ($S_2$) is 2. In the embodiment illustrated in FIGS. 9A-9C, the machine periodicity is 2 (i.e. (16*26)/208=2 based on equation (2)). This is also seen in FIGS. 9B and 9C, where there are two flux paths in opposite directions.

Figure 10A:
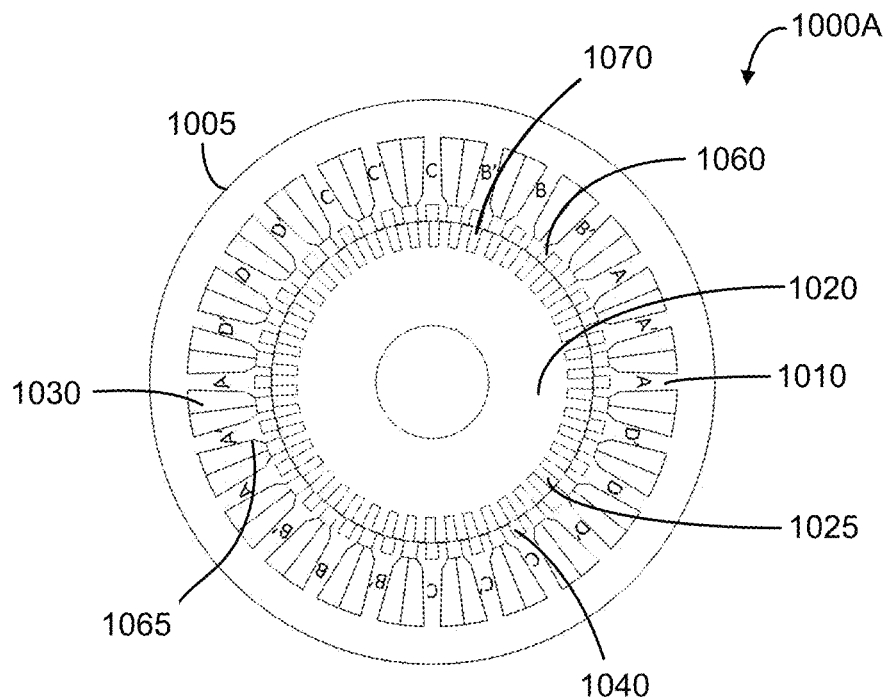
FIG. 10A shows a cross-sectional view of a switched reluctance machine according to an example.

Reference is next made to FIG. 10A, which shows an example cross-sectional view of SRM 1000A. SRM 1000A has a stator 1005, a rotor 1020, stator poles 1010, rotor poles 1025 and stator teeth 1060. SRM 1000 also has stator tooth-tips 1065.

In the configuration of SRM 1000A, coils 1030 are wound around the stator poles 1005 to provide a four-phase SRM. However, the SRM 1000A has an auxiliary slot 1040, which does not have any copper windings.

As illustrated in SRM 1000A, the SRM configuration has twenty-four (24) stator poles 1010, forty-eight (48) stator teeth 1060, and forty-six (46) rotor poles 1025, i.e. an 24/48/46 SRM configuration.

Figure 10B:
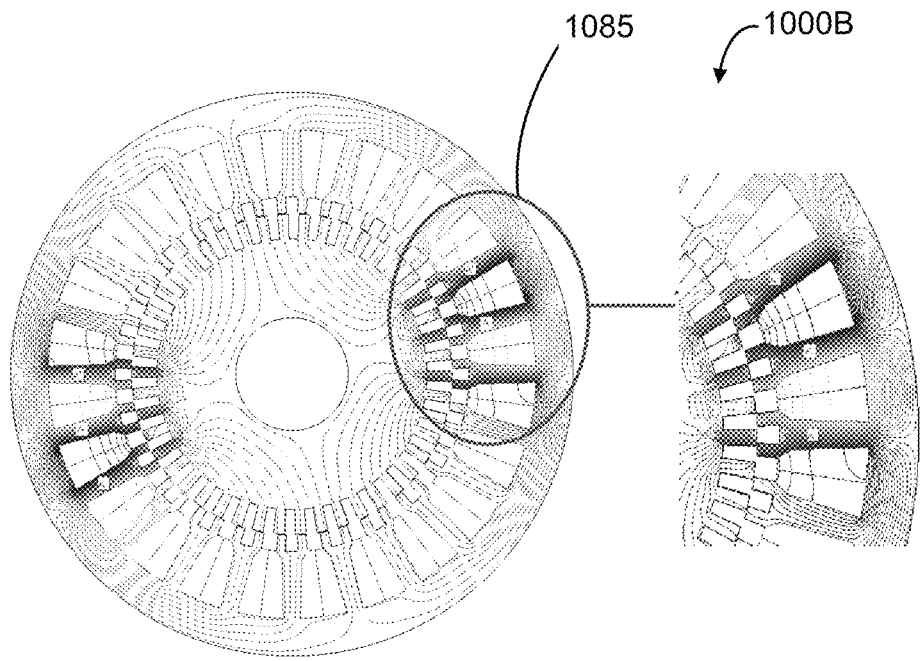
FIG. 10B shows a cross-sectional view of the switched reluctance machine of FIG. 10A in an unaligned position according to an example.

FIG. 10B shows an example configuration of SRM, such as SRM 1000B. In particular, FIG. 10B shows the magnetic flux lines 1085 when the SRM 1000A is in an unaligned position, where the center of a rotor slot 1070 is aligned with the center of a stator tooth 1060.

Figure 10C:
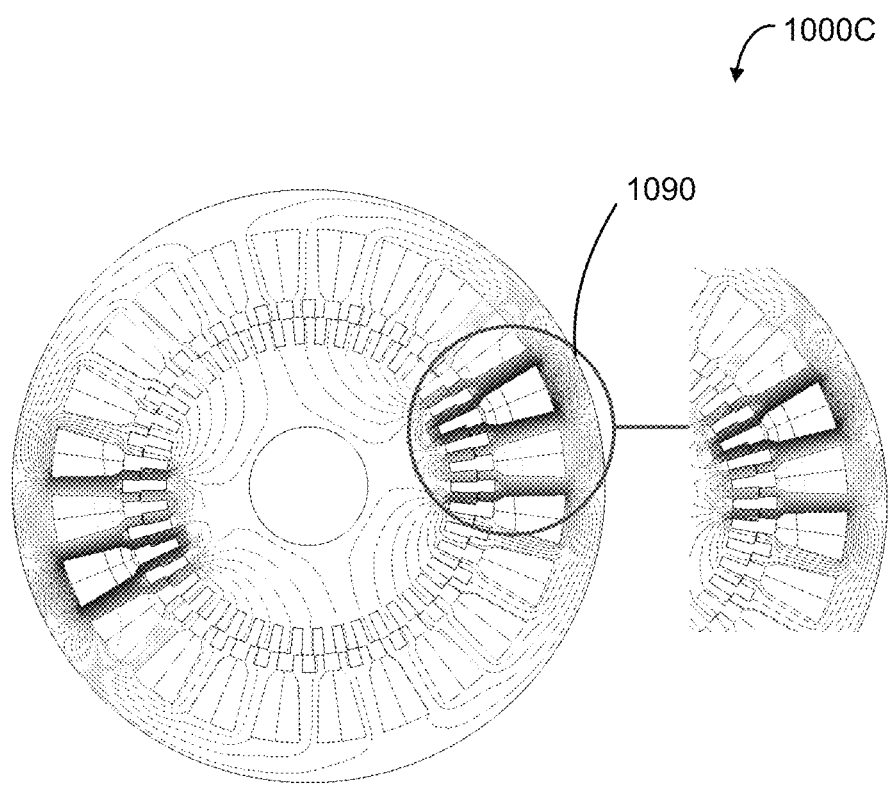
FIG. 10C shows a cross-sectional view of the switched reluctance machine of FIG. 10A in an aligned position according to an example.

FIG. 10C shows an example configuration of SRM, such as SRM 1000C. In particular, FIG. 10C shows the magnetic flux lines 1090 when the SRM 1000A is in an aligned position. In the aligned position, the center of a rotor pole 1025 is aligned with the center of a stator tooth 1060.

As shown in FIG. 10A, the winding configuration of coils 1030 in the counterclockwise direction is A-A'-A-B'-B-B'-C-C'-C-D'-D-D' for one half of the stator circumference. In this case, the adjacent pole pairs having opposite polarities ($S_2$) is 3. In the embodiment illustrated in FIGS. 10A-10C, the machine periodicity is 2 (i.e. (24*46)/552=2 based on equation (2)). This is also seen in FIG. 10C, where there are two flux paths in opposite directions.

Figure 11A:
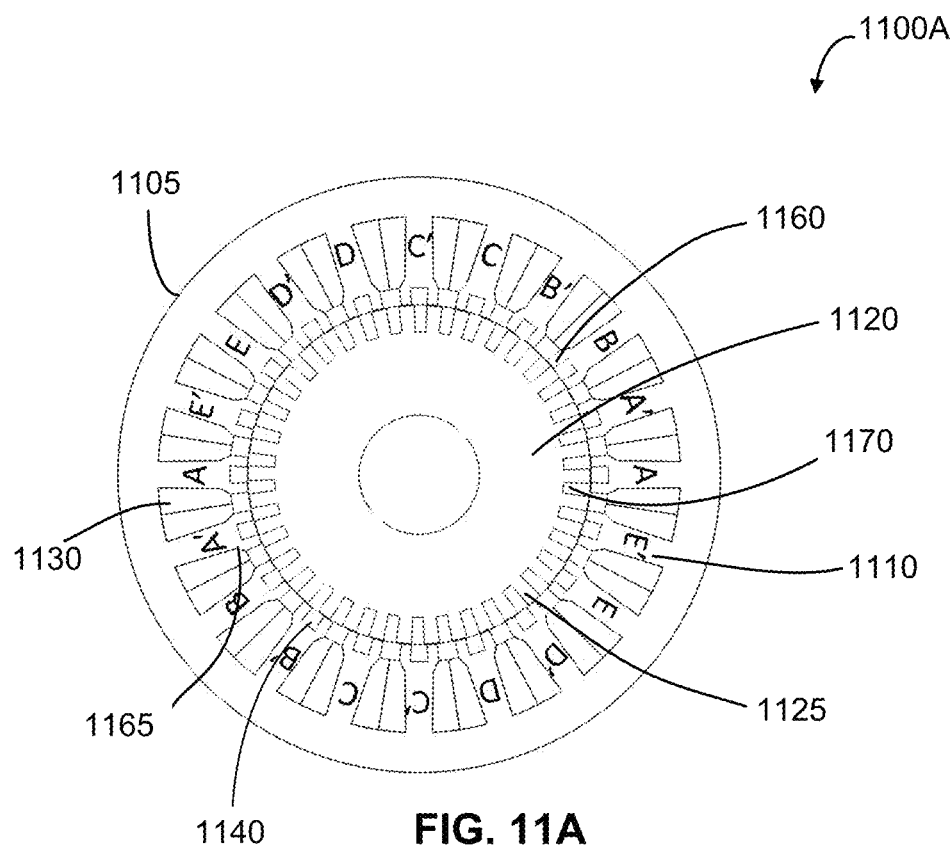
FIG. 11A shows a cross-sectional view of a switched reluctance machine according to an example.

Reference is next made to FIG. 11A, which shows an example cross-sectional view of SRM 1100A. SRM 1100A has a stator 1105, a rotor 1120, stator poles 1110, rotor poles 1125 and stator teeth 1160. SRM 1100 also has stator tooth-tips 1165.

In the configuration of SRM 1100A, coils 1130 are wound around the stator poles 1105 to provide a five-phase SRM. However, the SRM 1100A has an auxiliary slot 1140, which does not have any copper windings.

As illustrated in SRM 1100A, the SRM configuration has twenty (20) stator poles 1110, forty (40) stator teeth 1160, and thirty-eight (38) rotor poles 1125, i.e. an 20/40/38 SRM configuration.

Figure 11B:
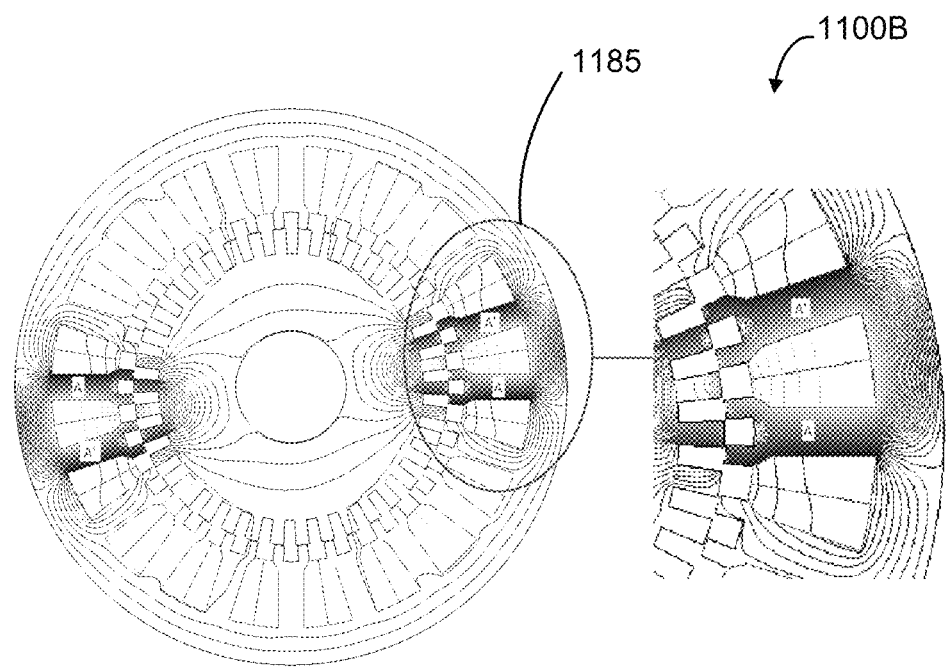
FIG. 11B shows a cross-sectional view of the switched reluctance machine of FIG. 11A in an unaligned position according to an example.

FIG. 11B shows an example configuration of SRM, such as SRM 1100B. In particular, FIG. 11B shows the magnetic flux lines 1185 when the SRM 1100A is in an unaligned position, where the center of a rotor slot 1170 is aligned with the center of a stator tooth 1160.

Figure 11C:
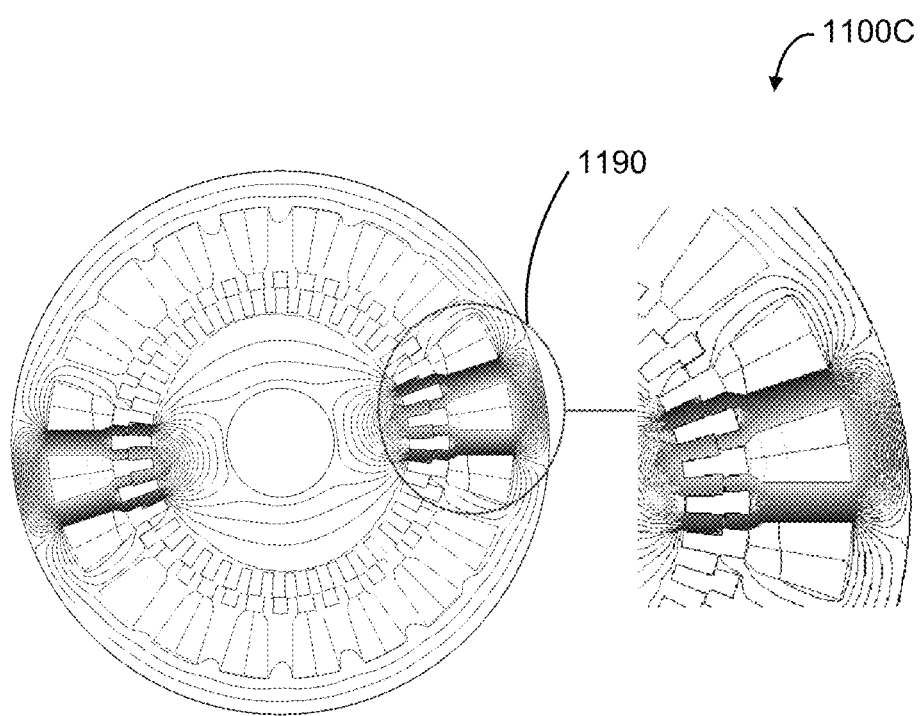
FIG. 11C shows a cross-sectional view of the switched reluctance machine of FIG. 11A in an aligned position according to an example.

FIG. 11C shows an example configuration of SRM, such as SRM 1100C. In particular, FIG. 11C shows the magnetic flux lines 1190 when the SRM 1100A is in an aligned position. In the aligned position, the center of a rotor pole 1125 is aligned with the center of a stator teeth 1160.

As shown in FIG. 11A, the winding configuration of coils 1130 in the counterclockwise direction is A-A'-B-B'-C-C'-D-D'-E-E' for one half of the stator circumference. In this case, the adjacent pole pairs having opposite polarities ($S_2$) is 2. In the embodiment illustrated in FIGS. 11A-11B, the machine periodicity is 2 (i.e. (20*38)/380=2 based on equation (2)). This is also seen in FIG. 11B, where there are two flux paths in opposite directions.

Various SRM configurations determined based on equation (1) are provided below. Table 1 provides SRM configurations for three-phase, multi-teeth SRMs:

| $N_{ph}$ | $N_s$ | $N_t$ | $N_r$ | Novel multi-teeth SRM |
|---|---|---|---|---|
| 3 | 12 | 24 | 22 | 12/24/22 |
|  | 12 | 36 | 34 | 12/36/34 |
|  | 12 | 36 | 38 | 12/36/38 |
|  | 12 | 48 | 46 | 12/48/46 |
|  | 18 | 36 | 34 | 18/36/34 |
|  | 24 | 48 | 44 | 24/48/44 |

Table 2 provides SRM configurations for four-phase, multi-teeth SRMs:

| $N_{ph}$ | $N_s$ | $N_t$ | $N_r$ | Novel multi-teeth SRM |
|---|---|---|---|---|
| 4 | 16 | 32 | 30 | 16/32/30 |
|  | 16 | 48 | 46 | 16/48/46 |
|  | 16 | 48 | 50 | 16/48/50 |
|  | 24 | 48 | 46 | 24/48/46 |

Table 3 provides SRM configurations for five-phase, multi-teeth SRMs:

| $N_{ph}$ | $N_s$ | $N_t$ | $N_r$ | Novel multi-teeth SRM |
|---|---|---|---|---|
| 5 | 20 | 40 | 38 | 20/40/38 |
|  | 20 | 60 | 58 | 20/60/58 |

While the present application has been described with reference to examples, it is to be understood that the scope of the claims should not be limited by the embodiments set forth in the examples, but should be given the broadest interpretation consistent with the description as a whole.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

The invention claimed is:

1. A switched reluctance machine comprising:
an axially extending shaft;
an axially extending rotor mounted to the shaft, the rotor having a plurality of salient rotor poles;
an axially extending stator disposed coaxially and concentrically with the rotor, the stator having a plurality of salient stator poles protruding radially from the stator towards the rotor poles, the stator further having a plurality of stator teeth and tooth-tips; and
a plurality of electrical coils wound about the stator poles, the plurality of electrical coils including a plurality of separate phase coils defining a plurality of phases of the switched reluctance machine,
wherein a number of stator poles is related to a number of rotor poles, a number of stator teeth, a number of stator teeth per stator pole, and a number of adjacent poles having opposite polarities, and a number of phases, according to equation (1) and at least one constraint condition:

$$N_s = \frac{N_t \times LCM(N_s, N_r)}{N_r \times N_{ph} \times S_1 \times S_2} \quad (1)$$

wherein $N_{ph}$ is the number of phases when $N_s=N_r+2$ if $S_1=2$, and
wherein $N_s$ is the number of stator poles, $N_r$ is the number of rotor poles, $N_t$ is the number of stator teeth, $N_{ph}$ is the number of phases, $S_1$ is the number of stator teeth per stator pole, $S_2$ is the number of adjacent poles having opposite polarities, and LCM is the lowest common multiple of number of stator poles and number of rotor poles.

2. The switched reluctance machine of claim 1, wherein the at least one constraint condition comprises equation (2):

$$\text{If } |N_s-N_r|=2p_1 \text{ and } |N_t-N_r|=2p_2; \ p_1>p_2 \text{ and mod}(p_1,p_2)=0 \quad (2).$$

3. The switched reluctance machine of claim 1, wherein the at least one constraint condition further comprises a greater distance between adjacent rotor poles of the plurality of rotor poles than an arc length of a stator tooth.

4. The switched reluctance machine of claim 1, wherein the at least one constraint condition further comprises each of a rotor pole arc length and a stator tooth arc length being larger than or equal to $$\frac{2\pi}{N_r N_{ph}}.$$

5. The switched reluctance machine of claim 1, wherein the at least one constraint condition further comprises equation (3), wherein $\beta_r$ is a rotor pole angle, $\beta_{rs}$ is a rotor slot angle, $\beta_s$ is a stator teeth angle and $\beta_{ss}$ is a stator slot angle:

$$3\beta_r+2\beta_{rs}>2\beta_s+\beta_{ss} \quad (3).$$

6. A method of manufacturing a switched reluctance machine having an axially extending shaft, an axially extending rotor mounted to the shaft, an axially extending stator disposed coaxially and concentrically with the rotor, the rotor having a plurality of salient rotor poles, the stator having a plurality of salient stator poles protruding radially from the stator towards the rotor poles, the stator further having a plurality of stator teeth and tooth-tips, the switched reluctance machine further having a plurality of electrical coils wound about the stator poles to define a plurality of phases of the switched reluctance machine, the method comprising:
determining a number of stator poles according to equation (1) and at least one constraint condition:

$$N_s = \frac{N_t \times LCM(N_s, N_r)}{N_r \times N_{ph} \times S_1 \times S_2} \quad (1)$$

wherein $N_{ph}$ is the number of phases when $N_s=N_r+2$ if $S_1=2$, and
wherein $N_s$ is the number of stator poles, $N_r$ is the number of rotor poles, $N_t$ is the number of stator teeth, $N_{ph}$ is the number of phases, $S_1$ is the number of stator teeth per stator pole, $S_2$ is the number of adjacent poles having opposite polarities, and LCM is the lowest common multiple of number of stator poles and number of rotor poles.

7. The method of claim 6, wherein the at least one constraint condition further comprises equation (2):

$$\text{If } |N_s-N_r|=2p_1 \text{ and } |N_t-N_r|=2p_2; \ p_1>p_2 \text{ and mod}(p_1,p_2)=0 \quad (2).$$

8. The method of claim 6, wherein the at least one constraint condition further comprises a greater distance between adjacent rotor poles of the plurality of rotor poles than an arc length of a stator tooth.

9. The method of claim 6, wherein the at least one constraint condition further comprises each of a rotor pole arc length and a stator tooth arc length being larger than or equal to $$\frac{2\pi}{N_r N_{ph}}.$$

10. The method of claim 6, wherein the at least one constraint condition further comprises equation (3), wherein $\beta_r$ is a rotor pole angle, $\beta_{rs}$ is a rotor slot angle, $\beta_s$ is a stator teeth angle and $\beta_{ss}$ is a stator slot angle:

$$3\beta_r + 2\beta_{rs} > 2\beta_s + \beta_{ss} \quad (3).$$

* * * * *